United States Patent
Scherhag et al.

[15] 3,655,519
[45] Apr. 11, 1972

[54] PROCESS FOR PURIFYING LIQUID HYDROCYANIC ACID BY ACID ADDITION AND SUBSEQUENT SEPARATION

[72] Inventors: Bernhard Scherhag, Leverkusen; Arnold Hausweiler, Dormagen, both of Germany

[73] Assignees: Farbenfabriken Bayer Aktiengesellschaft, Leverkusen; Erdolchemie Gesellschaft mit beschrankter Haftung, Cologne, Germany

[22] Filed: Jan. 31, 1969

[21] Appl. No.: 795,534

[30] Foreign Application Priority Data

Feb. 2, 1968 Germany ..................... P 16 67 786.4

[52] U.S. Cl. .................................... 203/6, 203/34, 203/35, 203/41, 203/81, 23/151, 260/465.3, 260/465.9
[51] Int. Cl. .................................................. B01d 3/34
[58] Field of Search ............... 23/151; 203/34, 35, 38, 6, 203/41; 260/465.1, 465.3, 465.9

[56] References Cited

UNITED STATES PATENTS

| | | | |
|---|---|---|---|
| 2,416,624 | 2/1947 | Hansley | 203/6 |
| 2,555,798 | 6/1951 | Kropa | 203/35 |
| 2,987,451 | 6/1961 | Sennewald et al. | 203/38 |
| 3,328,266 | 6/1967 | Modeano et al. | 203/34 |
| 3,329,582 | 7/1967 | Sennewald et al. | 203/6 |
| 3,376,203 | 4/1968 | Lackey | 203/41 |

FOREIGN PATENTS OR APPLICATIONS

| 1,174,303 | 7/1964 | Germany | 203/35 |
|---|---|---|---|

*Primary Examiner*—Wilbur L. Bascomb, Jr.
*Attorney*—Burgess, Dinklage & Sprung

[57] ABSTRACT

Purification of hydrocyanic acid such as obtained from ammoxidation by reacting the crude product containing aliphatic and/or isocyclic unsaturated hydrocarbons and/or heterocyclic compounds with a hydrohalic acid or an oxyacid of sulfur or phosphorus, preferably in concentrated form, and thereafter separating the reaction products from the hydrocyanic acid, such as by distillation or adsorption, and recovering substantially pure hydrocyanic acid.

7 Claims, 1 Drawing Figure

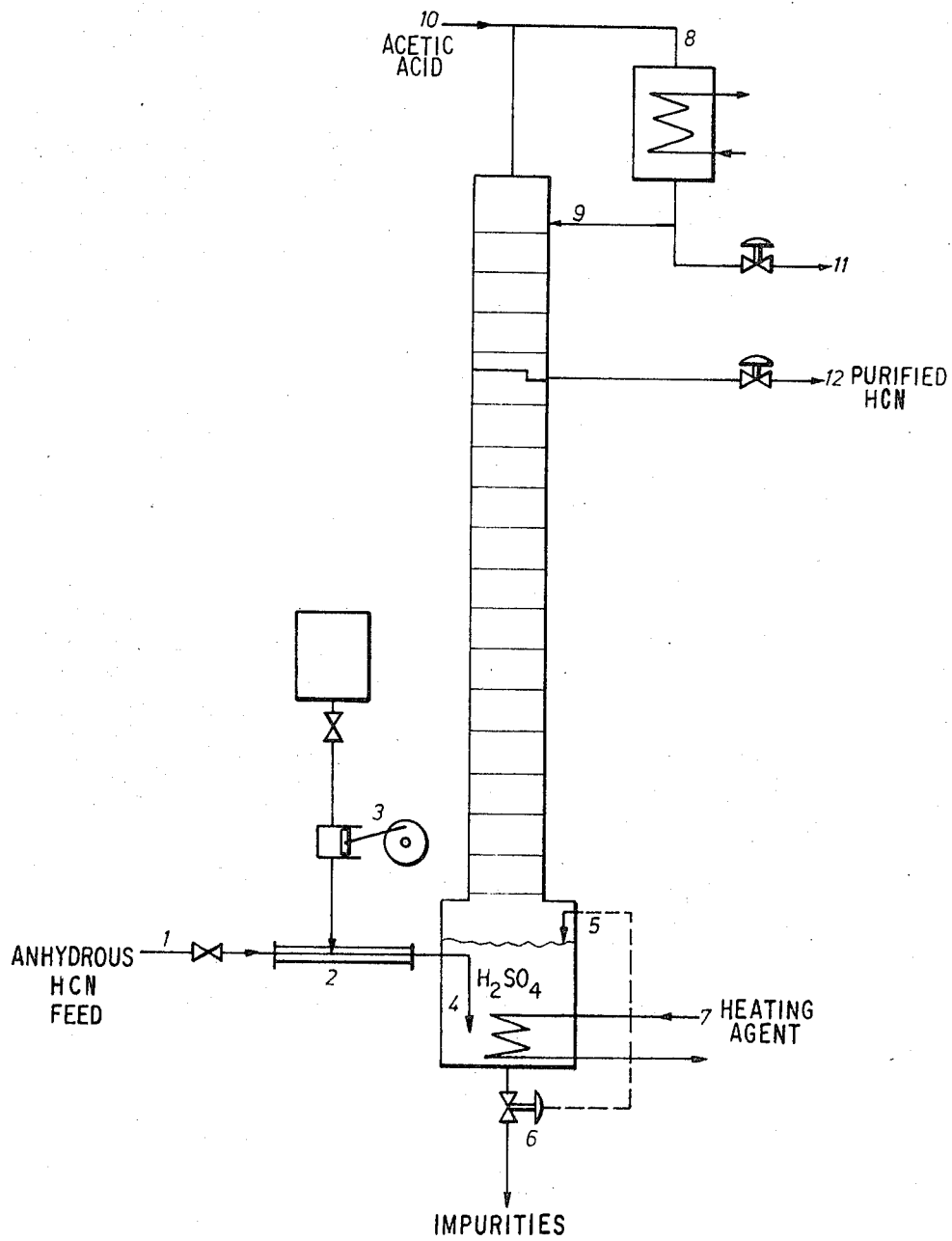

PROCESS FOR PURIFYING LIQUID HYDROCYANIC ACID BY ACID ADDITION AND SUBSEQUENT SEPARATION

This invention relates to a process for purifying liquid hydrocyanic acid and is particularly concerned with the so-called ammoxidation process. According to Chemical Engineering Progress, 60, No. 9 (1964), p. 48 or La Chimica l'Industria (Milano) 46 (1964), pp. 1,311–1,316, by "ammoxidation" is meant the reaction of hydrocarbons with oxygen and ammonia to form carboxylic acid nitriles, e.g. the reaction of propylene with oxygen and ammonia to form acrylic acid nitrile. Hydrocyanic acid, which contains varying quantities of impurities according to the method employed for working-up, is obtained as a by-product of the process.

Crude hydrocyanic acid in liquid form, for example, is obtained from a crude condensate of acrylonitrile after a preliminary distillation. In order that this hydrocyanic acid may be usable in further reactions, it must be purified so that, after suitable stabilization, it is quite harmless to handle and can be stored. The most harmful impurities are precisely those substances which are capable of reacting with hydrocyanic acid itself and/or its stabiliser, e.g. aliphatic and/or isocyclic unsaturated hydrocarbons and/or heterocyclic compounds. Owing to the special property of anhydrous hydrocyanic acid of reacting with these impurities as a solvating agent, they may cause discoloration of the normally water-clear hydrocyanic acid. As little as 100 to 200 ppm, for example, of the above-mentioned hydrocarbons or heterocyclic compounds are sufficient to cause discoloration which interferes with stabilization. In the distillative purification of hydrocyanic acid normally employed, the above-mentioned impurities can only be partly removed. Those impurities whose boiling points are close to that of hydrocyanic acid, e.g. pentene-1 (= 30° C.); pentene-2 (= 36° C.); 2-methylbutene-1 (= 31° C.); 3-methylbutene-1 (= 25° C.); 1,3-cyclopentadiene (= 41° C.); n-propylacetylene (= 40° C.); furane (= 32° C.), or those which form an azeotropic mixture with hydrocyanic acid, are difficult or impossible to separate from the hydrocyanic acid by distillation.

One object of this invention is the recovery of substantially pure hydrocyanic acid from the impurity-containing product without the above-mentioned difficulties. This and still further objects will become apparent from the following description read in conjunction with the drawing which diagrammatically illustrates an embodiment of an apparatus for performing the process in accordance with the invention.

We have now found that the liquid hydrocyanic acid which is produced in ammoxidation processes such as, for example, the acrylonitrile synthesis, which is recovered from a crude concentrate of acrylonitrile after a preliminary distillation; and which contains impurities of unsaturated aliphatic and/or isocyclic hydrocarbons and/or heterocyclic compounds, can be purified by adding acids which are suitable for stabilising them and separating the resulting coloured reaction products from the said hydrocarbons and/or the heterocyclic compounds and the acids and/or the hydrocyanic acid.

The unsaturated hydrocarbons found as impurities in the hydrocyanic acid obtained in the known ammoxidation processes may, for example, be unsaturated once in the molecule, such as propylene, n-butene and iso-butene, methyl but and pentene, or they may multiply unsaturated, such as acetylene, mono- and divinyl acetylene, allene, methylallene, butadiene, isoprene, piperylene, pentadiene or cyclopentadiene. Heterocyclic compounds such as furane and pyridine may also occur as impurities in the hydrocyanic acid. Their quantity depends on the particular method of synthesis and recovery of the ammoxidation process employed and is generally about 0.1 to 2 percent by weight, based on the quantity of hydrocyanic acid.

The acid which may be used in accordance with the invention include hydrohalic acids, preferably hydrochloric acid, oxyacids of sulphur and of phosphorus, e.g. sulphuric acid, sulphurous acid, ortho-, meta- and pyrophosphoric acid and alkylsulphonic acids such as methanesulphonic acid or ethanesulphonic acid or arylsulphonic acids such as benzene sulphonic acid or p-toluene sulphonic acid. It is preferably that the acid is added to the hydrocyanic acid in concentrated form, e.g. as 96 percent sulphuric acid or 85 percent orthophosphoric acid or as gaseous hydrogen chloride or crystalline p-toluenesulphonic acid in order not to add any additional water which may, for example, cause hydrolysis of the hydrocyanic acid in a subsequent distillation. Therefore it is preferable that the acids contain not too much water, e.g., not more than 15 percent by weight.

The acid may, for example, be added in twice to 10 times by weight the sum of the above-mentioned impurities contained in the hydrocyanic acid but should generally not be more than 5 percent by weight, and preferably about 2 percent by weight of the hydrocyanic acid. In general it is not advantageous to use less of the acid than 0,1 percent by weight of the hydrocyanic acid.

To carry out the process according to the invention, the crude hydrocyanic acid which is to be purified may be treated with the appropriate quantity of mineral acid in a tank or vat equipped with cooling devices and stirrers or circulating pump devices, the mineral acid being left to act until all the above-mentioned impurities have undergone reaction, and the reaction products produced from the hydrocarbons and/or heterocyclic compounds and the added mineral acid being then removed.

The time required for complete reaction of the unsaturated hydrocarbons and/or heterocyclic compounds depends large on the temperature of the crude hydrocyanic acid. It can be determined e.g. by taking from time to time a sample from the mixture treated according to the invention distilling of the hydrocyanic acid or treating the mixture with active carbon and determining the amount of the underrived compounds by gas chromatography. It is generally in the region of 10 to 50 hours at a temperature of 0° C. but is reduced to about 10 to 50 minutes at the boiling point of hydrocyanic acid. The crude hydrocyanic acid which has been treated with mineral acid is either removed from the higher boiling reaction product by distillation over a column, or the crude hydrocyanic acid which has been treated with mineral acid is passed through a tower of active charcoal to remove the reaction products of unsaturated hydrocarbons and/or heterocyclic compounds and the mineral acid added, the reaction products being removed by adsorption.

A special method of carrying out the process according to the invention, by which crude hydrocyanic acid may be purified in a particularly simple manner and which is especially suitable for the continuous removal of unsaturated hydrocarbons and/or heterocyclic compounds, consists in carrying out the reaction in the sump of a continuously operating distillation column. In this process, the hydrocyanic acid which is to be purified is advantageously introduced into the liquid phase of the sump of the continuously operating distillation apparatus. The reaction between the impurities and the added mineral acid proceeds very rapidly owing to the normally elevated temperature, for example 25° or 30° C., and the reaction products may be withdrawn continuously together with other higher boiling impurities of hydrocyanic acid.

The process according to the invention will now be described with reference to the accompanying drawing which is the sole FIGURE and which shows highly diagrammatically such a continuous distillation column.

The anhydrous hydrocyanic acid which may contain other lower boiling or higher boiling by-products such as cyanohydridrins in addition to the saturated hydrocarbons and/or heterocyclic compounds is fed through a control valve at 1 into a mixing zone 2. In this zone, it is mixed with a mineral acid, e.g. sulphuric acid, which is supplied to the mixing zone 2 from a dosing pump 3, and is introduced into the sump of the column at 4. The sump level is kept constant by the level control device 5 and a control valve 6. Heat is supplied by steam passed through the internal coil or in any other conventional manner such as by an external reboiler. The rising hydrocyanic acid vapours are liquefied in a condenser 8 and returned to the column as a reflux 9. In order that no unwanted polymerisation of hydrocyanic acid can take place in the column and the condenser, an organic acid which is suitable for stabilization, such as acetic acid, is added in known manner through a conduit 10 at the top of the column.

A first runnings 11 may be removed as required at the reflux; the pure hydrocyanic acid is advantageously removed from the column in a side-stream through a control valve 12 several plates below the top of the column.

The invention is illustrated in the following Examples, given by way of illustration and not limitation.

EXAMPLE 1

1,000 kg of a 95 percent hydrocyanic acid which contained 0.5 percent of water, 0.76 percent by weight of impurities of the $C_3$ to $C_4$ fraction consisting of olefines and heterocyclic compounds and 0.03 percent by weight of impurities of the $C_5$ to $C_9$ fraction consisting of olefines and heterocyclic compounds in addition to acetaldehyde, acrolein, acetone and benzene were fed per hour into a distillation column similar to that shown in the drawing and described above.

The column was stabilized with 0.1 percent by weight of acetic acid in the usual manner. 2 kg of concentrated sulphuric acid per hour were added to the hydrocyanic acid by means of a dosing pump through the mixing zone before introduction into the bottom, a sulphuric acid concentration of 2 percent by weight being established when the bottom discharge was 100 kg/hour. When the column was in a state of equilibrium, hydrocyanic acid which contained less than 100 ppm of the above-mentioned olefines was removed from the side-stream.

A parallel test in which no sulphuric acid was added to the hydrocyanic acid introduced in addition to the acetic acid at the top of the column showed practically the same unsaturated hydrocarbon content as before distillation.

EXAMPLE 2

10,000 kg of a hydrocyanic acid which had been freed from water and all other higher boiling impurities by a preliminary distillation still contained about 0.14 percent by weight of impurities consisting of unsaturated hydrocarbons and heterocyclic compounds. After the addition of 0.5 percent by weight of 85 percent orthophosphoric acid, the hydrocyanic acid was circulated by pumps for 24 hours in a storage tank at 2° C. During this time, it assumed a color conforming to APHA > 50 (the APHA number is defined as the standard method for assessing water and water-clear liquids under No. D 1686-61 in "1961 Supplement to Book of ASTM Standards Including Tentatives, Part 10" issued by the American Society for Testing Materials, Philadelphia, Pa., U.S.A., 1961). The hydrocyanic acid which was discoloured in this way was then circulated by a pump for 3 hours through a tower of active charcoal containing 210 liters. The products of reaction between phosphoric acid, the above-mentioned impurities and hydrocyanic acid were by that time removed to such an extent that the colour determination gave a value of APHA > 10 (water clear).

A parallel test with acetic acid showed no success.

EXAMPLE 3

100 g of a crude hydrocyanic acid which contained 0.175 percent by weight of unsaturated hydrocarbons in addition to 0.5 percent by weight of water and 0.5 percent by weight of acetaldehyde were heated to boiling for 2 hours in a flask with a reflux cooler. During this time, the acetaldehyde underwent reaction to form lactic acid nitrile. 0.2 g of pure p-toluene sulphonic acid was then added and the reaction mixture was again heated under reflux for 1 hour. 95 g of hydrocyanic acid were then distilled off. The distillate contained less than 100 ppm of acetaldehyde and less than 100 ppm of unsaturated hydrocarbons.

A parallel test without the addition of p-toluene sulphonic acid yielded a distillate containing 0.3 percent by weight of acetaldehyde and 0.17 percent by weight of unsaturated hydrocarbons.

EXAMPLE 4

In the procedure described below, the distillation of hydrocyanic acid is carried out in such a manner, using sulphuric acid for the removal of unwanted organic by-products, that the purification process operates in a practically loss-free way.

1,000 kg of crude hydrocyanic acid containing the following by products: 490 ppm olefines, 100 ppm acetaldehyde, 1,000 ppm acrylonitrile, 200 ppm benzene and 2,000 ppm water were introduced hourly into a distillation column corresponding to that illustrated in the accompanying drawing. About 1 kg of 96 percent $H_2SO_4$ is fed hourly into the bottom of the column and distillation is carried out under normal pressure.

2,500 to 3,500 kg of reflux per hour flow down to the uppermost plate of the column, and 100 to 200 kg per hour are withdrawn from the reflux and returned to the bottom of the column. Unwanted by-products are then again brought into contact with sulphuric acid and bound. Pure, liquid hydrocyanic acid which, apart from small quantities of benzene, no longer contains any organic by-products is withdrawn from the upper third of the column.

70 to 80 kg per hour are removed from the bottom of the column and returned before distillation into a section of the recovery in which the hydrocyanic acid portion of the bottom product is again combined with the main reaction stream, and the sulphuric acid and its reaction products are discharged with organic by-products in the form of an aqueous solution.

We claim:

1. Process for the purification of an impure hydrocyanic acid product of at least about 95 percent obtained by distillation from a mixture containing acrylonitrile, the 95 percent HCN containing at least one impurity of the group consisting of aliphatic unsaturated hydrocarbons, isocyclic unsaturated hydrocarbons and oxygen or nitrogen heterocyclic compounds, which comprises adding an acid selected from the group consisting of hydrohalic acids, oxyacids of sulfur and oxyacids of phosphorus to the impure product and thereafter separating the reaction products formed by the acid addition from the hydrocyanic acid by adsorption or distillation and recovering substantially pure hydrocyanic acid.

2. Process according to claim 1, in which the added acid is selected from the group consisting of hydrochloric acid, sulfuric acid, alkylsulfonic acids, arylsulfonic acids and p-toluene sulfonic acid.

3. Process according to claim 1, in which the added acid is in a concentrated form.

4. Process according to claim 3, in which the acid is added in amount ranging from about twice the weight of said impurities to up to 5 percent by weight of the hydrocyanic acid.

5. Process according to claim 1, in which the acid is added in amount ranging from about twice the weight of said impurities to up to 5 percent by weight of hydrocyanic acid.

6. Process according to claim 1, in which said impure hydrocyanic acid product is a product obtained by ammoxidation of propylene, in which said added acid is selected from the group consisting of concentrated sulfuric acid, concentrated orthophosphoric acid and p-toluene sulfonic acid in amount ranging from about 2 to 5 percent by weight based on the hydrocyanic acid, and in which the reaction products are separated from the hydrocyanic acid by adsorption on active charcoal.

7. Process according to claim 1, in which said impure hydrocyanic acid product is a product obtained by ammoxidation of propylene, in which said added acid is selected from the group consisting of concentrated sulfuric acid, concentrated orthophosphoric acid and p-toluene sulfonic acid in amount ranging from about 2 to 5 percent weight based on the hydrocyanic acid, and in which the reaction products are separated from the hydrocyanic acid by distillation.

* * * * *